United States Patent [19]

Dailey et al.

[11] 3,708,788

[45] Jan. 2, 1973

[54] ASSOCIATIVE MEMORY CELL DRIVER AND SENSE AMPLIFIER CIRCUIT

[75] Inventors: Jack R. Dailey, Apalachin; John G. Surgent, Endwell, both of N.Y.

[73] Assignee: International Business Machines Corporation, Armonk, N.Y.

[22] Filed: Nov. 11, 1971

[21] Appl. No.: 197,907

[52] U.S. Cl.......340/173 R, 340/172.5, 340/173 AM, 307/238

[51] Int. Cl...........................G11c 11/40, G11c 15/00

[58] Field of Search......340/173 AM, 172.5, 173 R, 340/173 CA

[56] References Cited

UNITED STATES PATENTS

| | | | |
|---|---|---|---|
| 3,181,061 | 6/1965 | Weimer | 340/173 AM |
| 3,191,061 | 12/1968 | Lee | 340/173 AM |
| 3,440,444 | 4/1969 | Rapp | 340/173 AM |
| 3,533,087 | 10/1970 | Zuk | 340/173 R |
| 3,533,088 | 10/1970 | Rapp | 340/173 R |
| 3,533,089 | 10/1970 | Wahlstrom | 340/173 CA |
| 3,588,844 | 6/1971 | Christensen | 340/173 R |
| 3,588,845 | 6/1971 | Ling | 340/173 R |
| 3,588,846 | 6/1971 | Linton | 340/173 R |
| 3,665,426 | 5/1972 | Gross | 340/173 R |

OTHER PUBLICATIONS

IBM Tech. Dis. Bul. "Associative Memory Cell" F. A. Behnke, Vol. 10, No. 11, April 1968, pp. 1715–1716.
IBM Tech. Dis. Bul. "MOSFET Associative Memory Cell", Vol. 12, No. 10, March 1970, pp. 1632–1633.

*Primary Examiner*—Terrell W. Fears
*Attorney*—John C. Black et al.

[57] ABSTRACT

An improved driver permits the driving of a functional array of four-state cells having only two bit lines per cell while providing for the writing of any one of four possible logical states (0, 1, X, Y) into the array during one write cycle. In a preferred form, the improved driver includes a first pair of field effect transistors which are selectively operated during write and search/select cycles to couple a pair of junctions (or nodes) in the driver to the pair of data bit lines of a cell. In the absence of "don't care" signals, additional field effect transistors respond to input data to the driver to apply complementary signals (01 or 10) to the nodes for application to the respective bit lines. In response to the receipt of "don't care" signals, field effect transistors in the driver electrically connect the two nodes causing the same selected signal level (00 or 11) to be applied to the data bit lines. A pair of field effect transistors are selectively operated during read cycles to couple the data bit lines to respective sense amplifiers. In a preferred form, the driver is comprised of complementary field effect transistors operated in the enhancement mode.

10 Claims, 9 Drawing Figures

INVENTORS
JACK R. DAILEY
JOHN G. SURGENT
BY John C Black
ATTORNEY

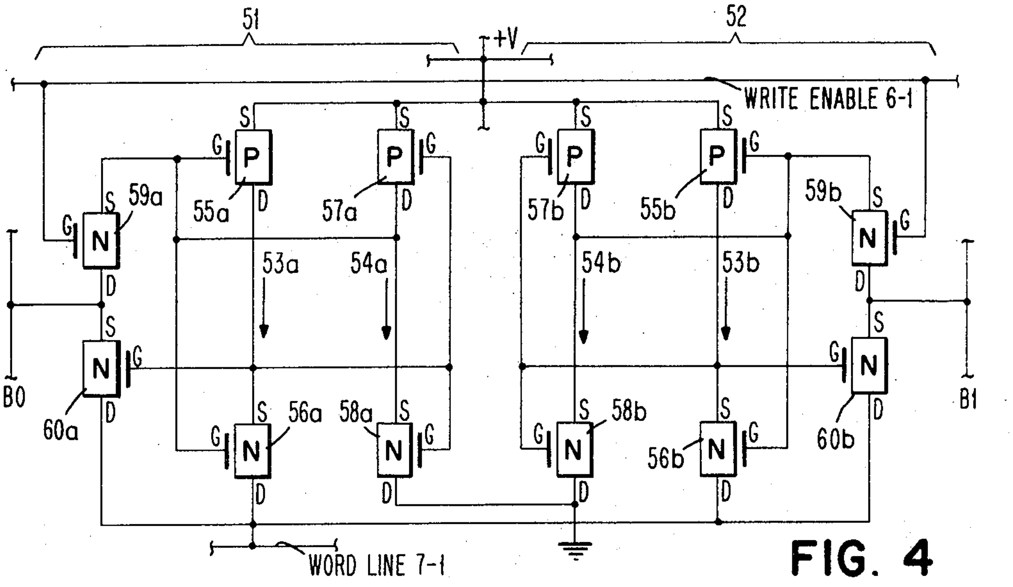
FIG. 4
TABLE 1
| B0 | B1 | 56a | 58a | 60a | 56b | 58b | 60b | CELL |
|---|---|---|---|---|---|---|---|---|
| 1 | 0 | ON | OFF | OFF | OFF | ON | ON | 0 |
| 0 | 1 | OFF | ON | ON | ON | OFF | OFF | 1 |
| 0 | 0 | OFF | ON | ON | OFF | ON | ON | X |
| 1 | 1 | ON | OFF | OFF | ON | OFF | OFF | Y |
STAGE 51 STAGE 52
FIG. 5
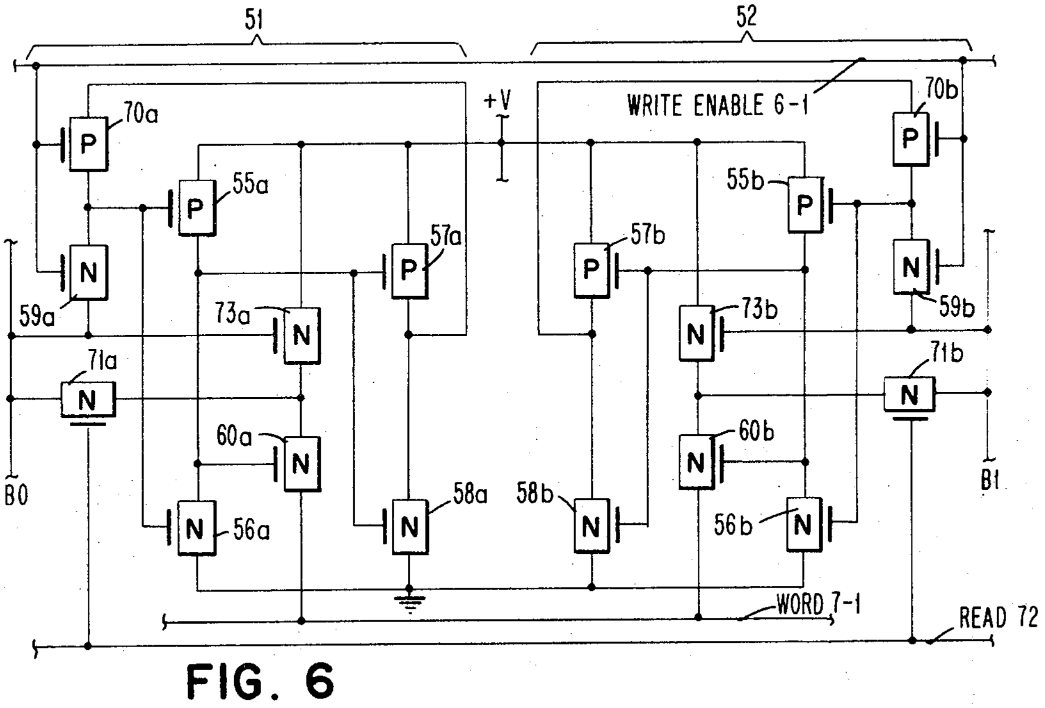
FIG. 6

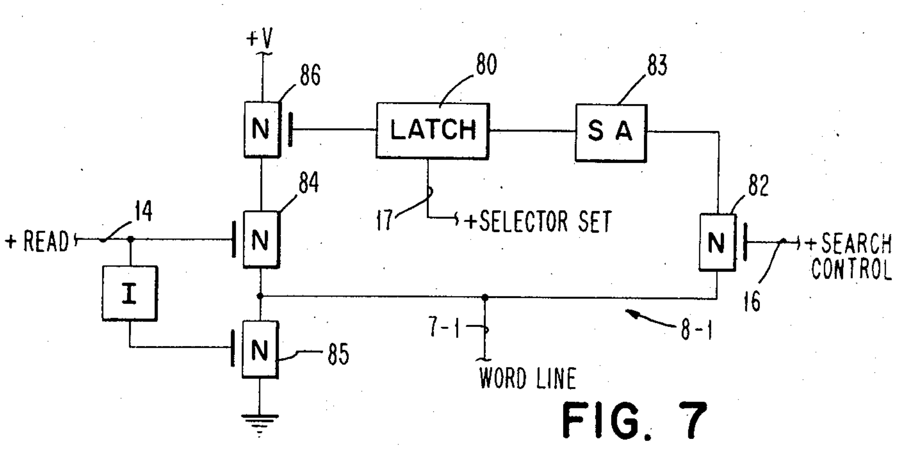
FIG. 7
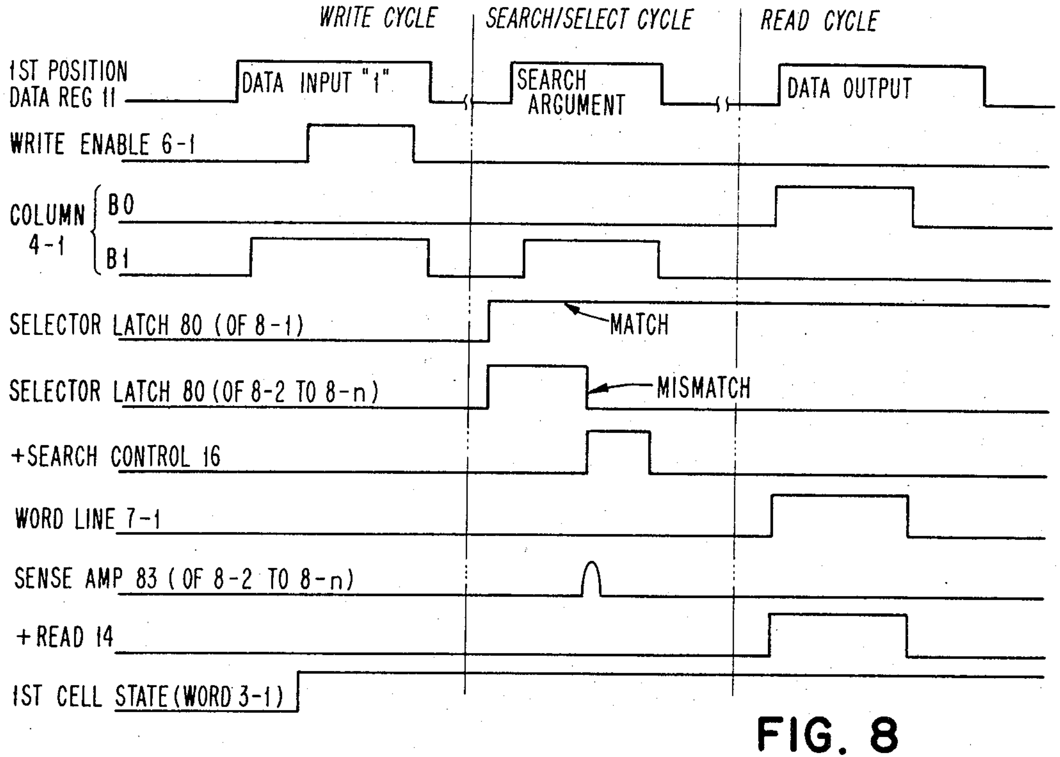
FIG. 8
*DATA REGISTER TABLE*
| CONTENT | REGISTER POSITION OUTPUT | B 0 | B 1 | -DON'T CARE |
|---|---|---|---|---|
| LOGICAL 1 | 1 (+V) | 0 (GRD) | 1 (+V) | 1 (+V) |
| LOGICAL 0 | 0 (GRD) | 1 (+V) | 0 (GRD) | 1 (+V) |
| X | 1 (+V) | 0 (GRD) | 0 (GRD) | 0 (GRD) |
| Y | 0 (GRD) | 1 (+V) | 1 (+V) | 0 (GRD) |
FIG. 9

ASSOCIATIVE MEMORY CELL DRIVER AND SENSE AMPLIFIER CIRCUIT

CROSS-REFERENCES TO RELATED APPLICATIONS

The present application shows and describes a functional memory having improved four-state cells preferably comprised of complementary insulated gate field effect transistors operated in the enhancement mode which together with the improved driver of the present application form a new and novel functional memory which has significant cost and performance advantages over known functional memories. Co-pending applications, Ser. Nos. 197,908 and 197,909, filed of even date herewith, respectively claim the improved cell and the improved functional memory including the combination of the improved cell and the improved driver of the present application.

BACKGROUND OF THE INVENTION

The present application is directed to an improved driver for a functional memory having four-state cells, the driver preferably being comprised solely of insulated gate field effect transistors operated in the enhancement mode. The driver circuit also includes similar transistors for coupling signals from the memory to a pair of sense amplifiers.

Known drivers and cells have made use of four bit lines per cell and in some instances have made use of two bit lines per cell where an additional write cycle is used to store a "don't care" state and/or have read data from the cell onto each of two or more bit lines in sequence rather than concurrently for sense amplifier detection. The improved driver of the present application concurrently applies the selected bit combinations to the two data bit lines of the cells during write cycles and during search/select cycles. In addition, the cell applies both selected bits to the data bit lines concurrently during a single read cycle for application to the sense amplifiers of the improved driver.

SUMMARY OF THE INVENTION

It is an object of the present invention to provide an improved driver for a four-state functional memory cell which is easily fabricated, exhibits very low power consumption, can be densely fabricated on a semiconductor chip and minimizes input-output requirements.

In a preferred form of the improved driver, complementary insulated gate field effect transistors operated in the enhancement mode are utilized. In one form, a first pair of complementary transistors respond to data in one bit position of an input data register to apply a signal level to one node in accordance with the signal level in the data register bit position. An additional field effect transistor responsive to the absence of a "-don't care" state couples the complemented signal to a second node within the driver. An additional pair of field effect transistors are operated to couple the nodes to the pair of data bit lines for a respective column of cells in response to a selected logical state in a corresponding bit position of a mask register during write cycles and during search/select cycles.

When a "don't care" signal is applied for writing one of two states X or Y into one of the corresponding cells in the column, an additional field effect transistor coupled between the two nodes connects the nodes, whereby the same signal level is applied to both data bit lines. The first-mentioned complementary transistors again apply the potential to the first node; the connecting field effect transistor couples this potential to the second node.

An additional pair of field effect transistors respond to read signals to couple the data bit lines to a pair of sense amplifiers.

In another form of the invention, single channel field effect transistor devices are utilized rather than complementary transistors.

BRIEF DESCRIPTION OF THE DRAWINGS

The foregoing and other objects, features and advantages of the invention will be apparent from the following more particular description of preferred embodiments of the invention as illustrated in the accompanying drawings.

In the drawings:

FIG. 4 is a schematic diagram of an improved four-state memory cell which is particularly well adapted for use with the improved driver of the present application;

FIG. 5 is a table illustrating the states of certain transistors in the cell of FIG. 4 for the logical states of the cell;

FIG. 6 is a schematic diagram of another form of the improved four-state cell of FIG. 4 particularly adapted for use with the improved driver of the present application;

FIG. 7 is a schematic diagram of a suitable selector latch and sense amplifier circuit for the array of FIG. 1;

FIG. 8 is a timing diagram illustrating one example of a write, search, read operation of the improved array and selected signal levels therein, and FIG. 9 is a truth table for the input-output data register.

DESCRIPTION OF THE PREFERRED EMBODIMENTS

In the following description, the terms "logical bits 1 and 0" are followed by (+V) and (ground), respectively, and they refer to logical signals outside the array cells. The terms "logical states 0 and 1" refer to cell states, and they are followed by the binary values (10) and (01) which values refer to signals applied to the B0, B1 data lines during write cycles to set the cells to their respective states. The truth tables of FIGS. 5 and 9 define the terms fully.

Attention is directed to the characteristic, typical in semiconductor memory cells, that read cycles cause readout of the complement of the input write signals to be applied to B0, B1.

Figure 1:
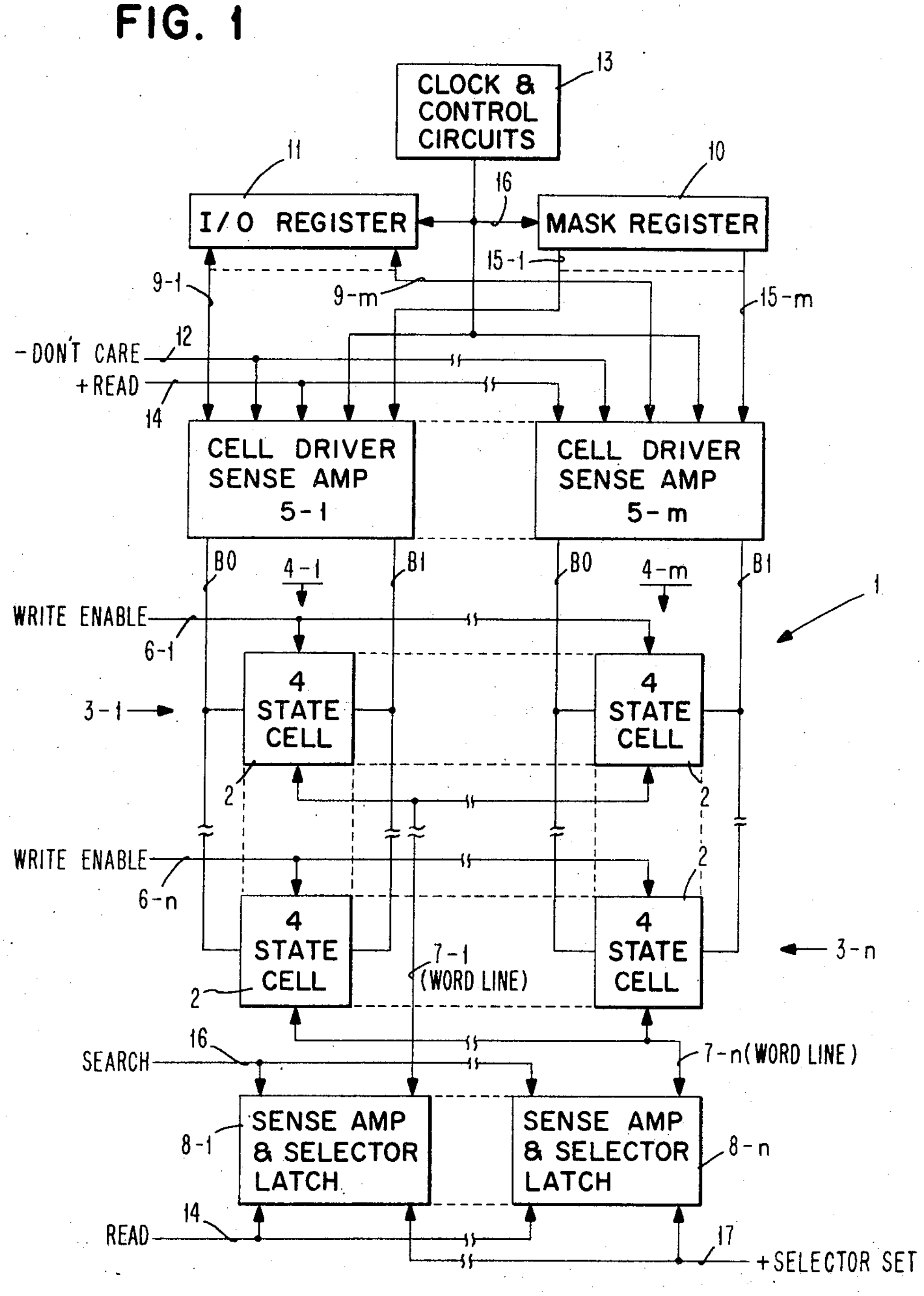
FIG. 1 is a fragmentary diagrammatic illustration of a functional memory array utilizing the improved driver of the present application.

In the diagrammatic illustration of FIG. 1, a functional memory or array 1 includes a plurality of four-state cells 2 arranged in rows to form multi-bit words 3-1 to 3-*n*. Cells in corresponding bit positions of the words are arranged in columns 4-1 to 4-*m*. Only the first and last bit positions of the first and last words are illustrated in FIG. 1.

Cell drivers and sense amplifiers 5-1 to **5-*m* are provided for the cells in columns 4-1, 4-*m*. The cells of each column are connected to a pair of bit lines B0 and B1, which bit lines are connected to the cell driver and sense amplifiers such as 5-1 of the corresponding column. These bit lines B0 and B1 are the lines over which data is written into and read from the cells 2** and over which search data is applied to corresponding cells during search/select operations.

Write enable lines 6-1 to **6-*n* are connected to the cells of respective words 3-1 to 3-*n*. Word lines 7-1 to 7-*n* are connected to the cells of respective words 3-1 to 3-*n*. The word lines 7-1 to 7-*n* are also connected to sense amplifier and selector latch circuits 8-1 to 8-*n*. A search line 16 is connected to sense amplifier and select latch circuits 8-1 to 8-*n***.

The respective cell drivers and sense amplifiers 5-1 to **5-*m* are each connected to a respective bit position in a mask register 10 through lines 15-1 to 15-*m* and in a data register 11 through lines 9-1 to 9-*m*. A "don't care" line 12 is connected to each of the cell driver and sense amplifier circuits 5-1 to 5-*m*. Suitable clock and control circuits 13 are connected to the write enable lines 6-1 to 6-*n* and the word lines 7-1 and 7-*n* for controlling the application of signals thereto. It will be appreciated that the clock and control circuits 13 also control the gating of data into and out of the mask and data registers through line 16** and where required in a well-known manner and will not be described further.

The operation of functional arrays in known in the art, and the operation of array 1 will therefore be described only briefly. It will be appreciated that various known modifications of the following description of operation may be made without departing from the teachings of the present application.

To write data into one or more word positions 3-1 to **3-*n* of the array 1, the data is first stored into the data register 11. The cell driver and sense amplifiers 5-1 to 5-*m* are then operated under control of the data register 11 and the presence or absence of the "don't care" signal on line 12 to set up the desired four-state signals (two binary bits) for application to the cells 2 as illustrated in FIG. 9. The mask register 10 is then set with logical 1 values in its bit positions corresponding to array word bit positions into which it is desired to write data. The presence of the logical 1 value in the appropriate mask register positions causes the four-state data set up in the driver and sense amplifier circuits 5-1 to 5-*m* to be applied to the respective bit lines B0 and B1. As will be seen below, the complement outputs of the mask register positions are used to gate data to lines B0, B1. Mask register positions containing logical 0 values will prevent corresponding data register contents from being applied to the B0 and B1 bit lines. Suitable signal levels (FIG. 8) are then applied to one or more write enable lines 6-1 to 6-*n* of the word position or positions into which it is desired to write the data. The signals on the write enable lines 6-1 to 6-*n* cause the corresponding word cells to be set to logical states corresponding to the logical values on their respective bit lines B0 and B1 as seen in FIG. 5**.

When it is desired to read data from a selected one or more word positions 3-1 to **3-*n* of the functional memory 1, it is necessary to first search the memory to determine which word position or positions are to be read out. Typically, each word of a functional memory comprises at least two sections, one of which is the search section and the other of which is the output or read data section. Thus, each word position 3-1 to 3-*n* includes at least the search portion and the data output portion. Correspondingly, certain of the cell driver and sense amplifiers 5-1 to 5-*m* will be rendered effective by the mask register 10 during the search/select operation, and other cell driver and sense amplifiers 5-1 to 5-*m*** will be rendered effective during the following read cycle.

In at least one recent design, the search/select and read cycles are concurrent. The teachings of the present improvement can be used in this latter design.

During the search/select operation, the mask register 10 and data register 11 are set with the selected binary values, and the presence or absence of the "don't care" signal exists on line 12. The driver and sense amplifiers 5-1 to **5-*m* selected by the mask register 10 are rendered effective to apply four-state search argument signals to the data lines B0 and B1 according to the truth table of FIG. 9. All of the cells 2 in the columns, corresponding to the driver and sense amplifiers rendered effective, are controlled by their respective input data lines B0 and B1 to cause a "mismatch" signal to be applied to their respective word lines 7-1 to 7-*n* only in the event that the state (0, 1, X) of the cell 2 does not match the state of the corresponding data lines B0 and B1 or in the event that the "don't care" Y state is stored in the cell. Prior to this operation, all of the selector latches in circuits 8-1 to 8-*n* have been set in a predetermined bi-stable state. A "mismatch" signal appearing on a word line 7-1 to 7-*n* during the search/select operation causes the corresponding selector latch in circuit 8-1 to 8-*n* to be reset to an initial bistable state. The failure of a "mismatch" signal to be applied to a word line 7-1 to 7-*n* results in failure to reset the selector latch in circuit 8-1 to 8-*n*, indicating a match condition. It is those set selector latches in circuits 8-1 to 8-*n***, indicating a match, which control the word positions during a succeeding read cycle to cause data to be read from the corresponding word positions.

During each read cycle, the selector latches in circuits 8-1 to **8-*n*, which are in their set states as a result of the search/select operation, apply signals to the corresponding word lines 7-1 to 7-*n*. Each cell in the data output portion of a selected word 3-1 to 3-*n* applies the word line signal to its corresponding data lines B0 and B1 in accordance with the respective state of the cell. These signals on the data lines B0 and B1 are applied to their respective driver and sense amplifier circuits 5-1 to 5-*m* to cause the sense amplifier portions of the circuits to store the data into a data register. The latter data register may be the same data register 11** or a separate register (not shown).

The data stored in the data register will be "masked" during a READ operation in the following manner. If a logical "0" occupies a position of the MASK register during a READ cycle, the corresponding position in the DATA register will be prevented from receiving the signals via the sense amplifiers in circuits 5-1. However, a logical "1" in the MASK register position will permit signals for the sense amplifiers in circuit 5-1 to pass to the corresponding DATA register position.

If more than one selector latch in circuit 8-1 to **8-*n*** is in its set state causing more than one word to be read out, then the outputs of the cells 2 in each column for the words being read out are OR'd together. Thus, a logical 1 state (+V) applied by any cell to any one line B0 or B1 will cause that line to be at the logical 1 (+V) level irrespective of the signals applied by other cells.

Figure 2:
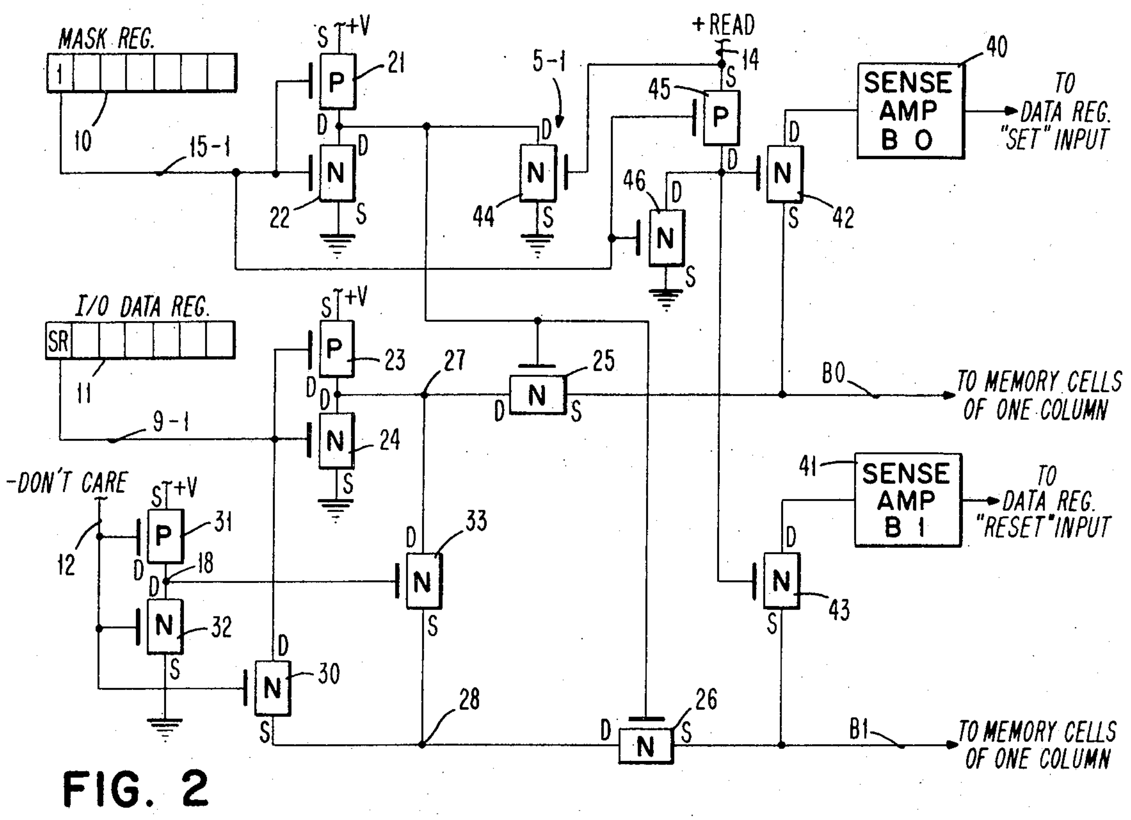
FIG. 2 is a schematic diagram of a preferred form of the improved driver.

The preferred embodiment of the improved cell driver and sense amplifier circuits 5-1 to 5-*m* is illustrated schematically in FIG. 2. FIG. 2 illustrates the cell driver and sense amplifier circuit 5-1 which is coupled to its respective data lines B0 and B1 in column 4-1. The circuit 5-1 is preferably comprised solely of complementary insulated gate field effect transistors operated in the enhancement mode, i.e., normally turned off until a signal of selected polarity and level is applied to the gate electrode. A pair of complementary P channel and N channel transistors 21 and 22 have their gate electrodes connected directly to each other and to the output complement 15-1 of the first bit portion of the mask register 10. A pair of complementary P channel and N channel transistors 23 and 24 have their gate electrodes connected directly to each other and to the output 9-1 of the first bit position of the input data register 11. The transistors 21 and 22 are connected in series with each other between a pair of terminals ground and +V of a two terminal supply. One of the advantages of the improved circuit of the present application is the requirement of only a two terminal supply. The field effect transistors 23 and 24 are also connected in series between the supply terminals.

A pair of N channel transistors 25 and 26 have their gate electrodes connected directly to each other and to the node 19 between transistors 21 and 22. The transistors 25, 26 couple the data lines B0 and B1, respectively, to a pair of nodes 27 and 28. The node 27 is the node between the series-connected transistors 23 and 24. The transistors 23 and 24 and an N channel transistor 30 (connected between the node 28 and the data register bit position) are effective in the absence of a "don't care" condition on line 12 for applying complemented signal levels to the nodes 27 and 28 (during write and search/select cycles).

A pair of complementary P channel and N channel transistors 31 and 32 are connected in series between the +V and ground terminals of the supply and have their gate electrodes connected directly to each other and to the "don't care" line 12. The node 18 between the transistors 31 and 32 is connected to the gate electrode of an N channel transistor 33. The transistor 33 has its source and drain terminals connected between the nodes 27 and 28.

When a "don't care" signal (ground) is applied to the line 12 (during write and search/select cycles), it turns on the transistor 31 which turns on the transistor 33 to short circuit the nodes 27 and 28 causing the same potential (logical value) to be applied from the data register bit position to both junctions by way of one of the transistors 23 or 24 in its on condition. With a "don't care" signal (ground) on line 12, the transistor 30 is turned off. In the absence of a "don't care" signal on line 12, i.e. +V, the transistor 30 is turned on causing the binary value in the bit position of register 11 to be applied to the node 28. At the same time, the same binary value in the bit position of the register 11 causes either the transistor 23 or the transistor 24 to be turned on to apply the complementary signal to the node 27.

The binary signal levels on the nodes 27 and 28 are applied to the corresponding data lines B0 and B1 when the transistors 25 and 26 are turned on in response to the existence of a logical 1 value in the corresponding bit position of the mask register 10. A logical 1 value in the corresponding bit position of the mask register 10 causes a ground level to be applied to the complement output 15-1 of the register 10. This ground level turns on transistor 21 causing it to apply a positive potential to the gates of the transistors 25 and 26 turning them on. A logical 0 value in the corresponding position of the mask register 10 causes a positive level to be applied to the gate of transistor 22 via complement output line 15-1 which turns it on. The transistor 22 applies ground potential to the gate electrodes of the transistors 25 and 26 opening the connection between the nodes 27 and 28 and their respective data lines B0 and B1.

The circuit 5-1 also includes a pair of sense amplifiers 40 and 41. A pair of N channel transistors 42 and 43 couple the B0, B1 data lines to the sense amplifiers 40, 41. The gate electrodes of the transistors 42 and 43 are connected directly to each other; to the read line 14 through P channel transistor 45; and to ground through N channel transistor 46. The read line 14 is also connected to the gate electrode of an N channel transistor 44. When a positive read signal is applied to the line 14, it turns on the transistor 44 causing a ground potential to be applied to the transistors 25 and 26 isolating the terminals 27 and 28 from the data lines B0 and B1. If a logical 1 is stored in the corresponding mask register position, the positive read signal is also coupled through transistor 45 and turns on the transistors 42 and 43 coupling the data lines B0 and B1, respectively, to the inputs of the sense amplifiers 40 and 41. If a logical 0 is in the corresponding mask register position, transistor 46 will be turned on and will apply a ground level to the gates of transistors 42 and 43 which prevents them from turning on thereby blocking any signals on B0 and B1 from the sense amplifiers 40 and 41.

Figure 3:
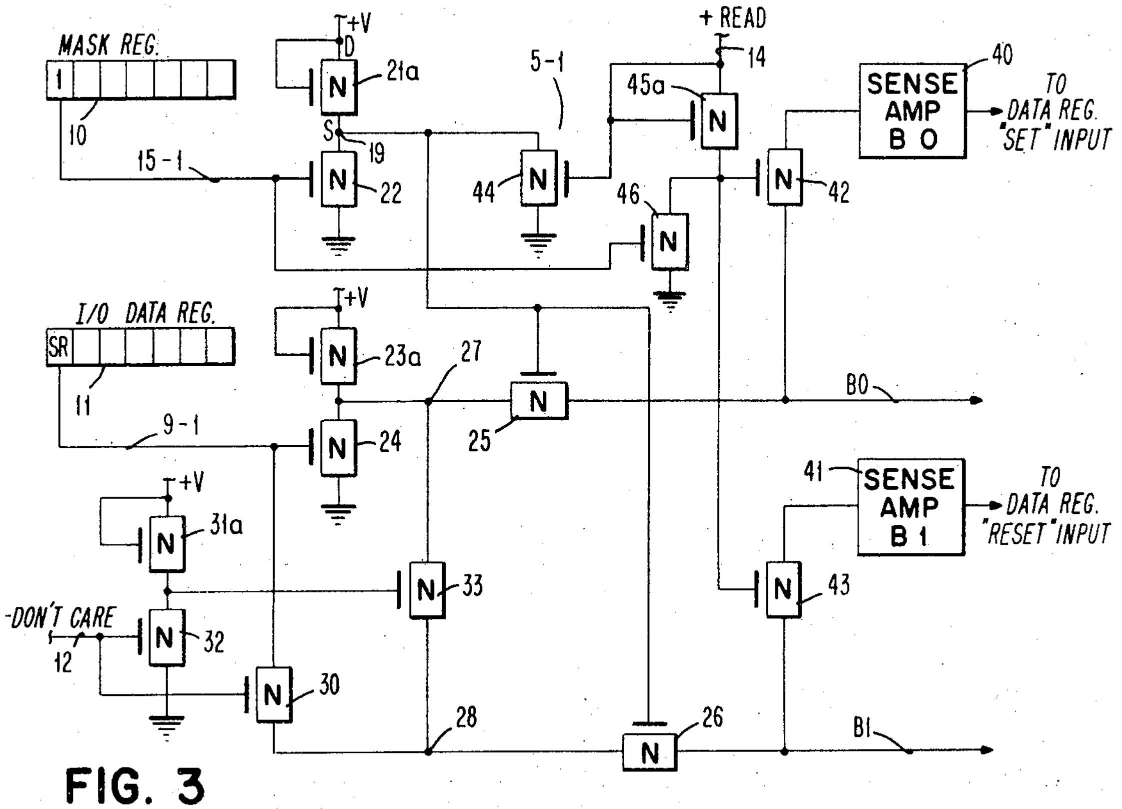
FIG. 3 is another form of the improved driver.

The embodiment of FIG. 3 is identical to that of FIG. 2 except that the P channel devices 21, 23, 31 and 45 have been replaced with N channel devices 21*a*, 23*a*, 31*a* and 45*a* which have their gate and drain connections short-circuited to each other so that the devices act as impedances. In the event that ground potential is applied to the series combination of transistors 21*a* and 22, the transistor 22 is turned off whereby the +V level is applied to the node 19 by way of the transistor 21*a* to turn on transistors 25, 26. In the event that a positive potential is applied to the gate electrode of the transistor 22, it is turned on applying a ground potential to the node 19 to turn transistors 25, 26 off. The series connected transistors 23*a* and 24, 31*a* and 32, and 45*a* and 46 operate in the same manner as that described above with respect to transistors 21*a* and 22. The circuit of FIG. 3 operates in the same manner as that described above with regard to FIG. 2.

FIG. 4 is a schematic diagram illustrating one preferred form of the improved cell 2 of FIG. 1 which is particularly useful in small arrays or in arrays where the performance (speed) requirements are not particularly critical. In the preferred form, the cells are comprised solely of complementary field effect transistors of the insulated gate type operated in the enhancement mode. The functional memory cell 2 can store all four states, 01, 10, 00 and 11 of the two binary bits on lines B0 and B1 as illustrated in FIG. 5. It is assumed by way of example that the cell of FIG. 4 is the cell in column 4-1 of word 3-1 in FIG. 1.

The cell 2 has two identical bistable stages 51 and 52 which store the two bit values applied to lines B0 and B1, respectively. The stages have two parallel branches 53*a*, 54*a*, and 53*b* and 54*b*. Branch 53*a* includes a pair of series connected, complementary P channel and N channel transistors 55*a* and 56*a* which operate in a complementary manner to provide low power drain. Branch 54a also has a pair of series connected P channel and N channel transistors 57*a* and 58*a*, which are also operated in a complementary manner to provide a low power drain.

The two branches 53*a* and 54*a* of the stage 51 act in a complementary manner to form a bistable latch. Specifically, either the transistors 56*a* and 57*a* are on, and the transistors 55*a* and 58*a* off; or alternatively, the transistors 55*a* and 58*a* are on, and the transistors 57*a* and 56*a* are off. The gate electrodes of the transistors 55*a* and 56*a* are connected directly to each other and to the source and drain terminals of the transistors 58*a* and 57*a*, respectively. Similarly, the gate electrodes of the transistors 57*a* and 58*a* are connected directly to each other and to the source and drain terminals of the transistors 56*a* and 55*a*, respectively.

Input to the stage 51 is provided by way of a write enable gate comprising an N channel transistor 59*a* whose drain terminal is connected to the data line B0. Its source terminal is connected directly to the gate electrodes of the transistors 55*a* and 56*a*. The gate electrode of the transistor 59*a* is connected to write enable line 6-1. A readout gate comprising an N channel transistor 60*a* selectively couples the data line B0 with the word line 7-1 during read cycles and during search/select cycles. The gate electrode of the transistor 60*a* is connected to the source and drain terminals of the transistors 56*a*, 55*a*. Thus, the transistor 60*a* forms the output gate for the latch comprising transistors 55*a*, 56*a*, 57*a* and 58*a*.

The stage 52 is a mirror image of stage 51 and includes a latch comprising P and N channel transistors 55*b*, 57*b* and 56*b*, 58*b*, respectively, a write enable gate 59*b* and a readout gate 60*b*. The gates 59*b* and 60*b* are N channel transistors.

It can be seen in FIG. 4 that the cell 2 uses only four signal lines, i.e., a write enable line 6-1, a word line 7-1 and the two data lines B0 and B1. The cell requires only a single power supply having two terminals, ground and +V.

Table 1 of FIG. 5 illustrates the various cell states, the on or off conditions of certain of the transistors within the latches and the B0 and B1 bit combinations which are applied to the cell during a write cycle to produce the corresponding cell states of 0, 1, X and Y. Thus, a cell state of 0 is produced during a write cycle when a logical 1 (positive) signal is applied to the data line B0 and a logical 0 (ground) potential is applied to the data line B1. Thus, during a write cycle with a positive potential applied to the data line B0, a positive signal is applied to write enable line 6-1 turning on the gate 59*a* which extends the positive signal on the line B0 to the gate electrodes of transistors 55*a* and 56*a*. The positive signal causes transistors 56*a* to turn on and transistor 55*a* to be off irrespective of their previous states. The word line 7-1 is at ground potential (via transistor 85, FIG. 7). When the transistor 56a turns on, it produces ground potential at its source terminal S causing the transistor 57*a* to turn on and the transistor 58*a* to turn off. When the transistor 57*a* turns on, it applies the positive supply potential to the gate electrode of the transistor 56*a* to maintain the latter in the on state. The write enable signal can then be removed.

At the same time, the logical 0 signal (ground) on the line B1 will have been applied to the gate electrodes of the transistors 55*b* and 56*b* by way of the write enable gate 59*b* causing the transistor 55*b* to turn on (if it is off) and the transistor 56*b* to turn off (if it is on). Transistor 55*b* causes a positive potential to be applied to the gate electrodes of transistors 57*b* and 58*b* causing the transistor 57*b* to be turned off (if it is on) and the transistor 58*b* to be turned on (if it is off).

With the transistor 56*a* turned on, transistor 60*a* will be in its off or high impedance state. With the transistor 56*b* off, the transistor 60*b* will be in its low impedance or on state.

Thus, the two latches 51, 52 in the cell 2 are in a condition such that the cell state of 0 is stored therein as indicated on the first line of table 1, FIG. 5. The 1, X and Y states of the cell can be stored in a generally similar manner as illustrated in table 1.

In the search/select operational mode, the desired binary signal levels are applied to the data lines B0, B1 and all array cells connected to these bit lines are interrogated simultaneously. During this mode of operation, the write enable lines such as line 6-1 are not energized whereby their corresponding gates such as 59*a* and 59*b* are turned off thereby isolating the bit line information from the inputs of the cell latches. Depending upon the state of each cell 2, the readout gates such as 60*a* and 60*b* will pass or block the signal levels on their respective data lines B0, B1 to or from the word line 7-1.

If during a search/select cycle, a logical 1 (0, 1) is stored in the cell 2 of FIG. 4 and logical 1 (+V), 0 (ground) signals are applied to the lines B0, B1, a mismatch will occur and a positive signal will appear on the word line 7-1. However, if logical 0 (ground), 1 (+V) signal levels are applied to the data lines B0, B1 while the cell 2 of FIG. 4 is in the logical 1 state, a match is obtained and ground potential is maintained on the word line 7-1 via transistor 85 of FIG. 7. More specifically, assume the cell 2 of FIG. 4 to be in the logical 1 state, that is, transistors 56*a*, 58*a*, 60*a*, 56*b*, 58*b* and 60*b* are in the states illustrated on line 2 of table 1, FIG. 5. Assume further that the logical 0 (ground) and 1 (positive) signals are applied to the lines B0 and B1, respectively. The transistor 60*a* being in the on state will couple ground potential from the line B0 to the word line 7-1. The transistor 60*b* being in the off state will block the positive potential on the data line B1 from the word line 7-1. Thus, a ground potential which is equivalent to a match condition exists on the word line 7-1. On the other hand, if logical 1 (+V) and 0 (ground) signal levels are applied to the data lines B0 and B1, respectively, while the cell 2 is in a logical 1 state, the transistor 60*a* being in the on state will couple the positive logical 1 signal on the data line B0 to the word line 7-1 corresponding to mismatch condition; and transistor **60*b* being in the off state, blocks the ground potential on line B1 from line 7-1**.

If the cell 2 is in the X state illustrated on line 3 of table 1, both transistors **60*a* and 60*b* are in their on states. If during a search/select cycle, a logical 0 (ground) appears on both data lines B0 and B1, the logical 0 signal level (ground) is applied to the word line 7-1 via transistors 60*a*, 60*b* indicative of a match. In the event that a logical 1 (positive) signal level is applied to either one or both of the data lines B0 and B1, one or both of the transistors 60*a*, 60*b* will couple the positive potential on its corresponding data line to the word line 7-1**. Thus, the X state will cause a mismatch when either a logical 1 or 0 is the search argument, i.e., a form of "mismatch" "don't care".

The Y state provides the "don't care" state in FIG. 4 during search/select cycles. If the cell 2 of FIG. 4 is in the Y state, both of the transistors **60*a* and 60*b* are in the off state. Thus, a positive potential cannot be applied from either data line B0 or B1 to the word line 7-1**, and they are sensed as logical 0s.

A read operation is initiated by applying a positive potential to the word lines 7-1 to **7-*n* and sensing the signals on the bit lines B0, B1 in the sense amplifier circuits such as that illustrated in FIG. 2. When the cell of FIG. 4 is in the logical 0 (1, 0) state, a positive signal on the word line 7-1 is applied only to the line B1 via transistor 60*b*; transistor 60*a* is off, blocking the positive potential from line B0. Note that the signal levels on B0, B1 during a "write" cycle are the opposite from the levels during a "read" cycle as in conventional semiconductor arrays. For example, to write a logical 0 (1, 0) into cell 2, positive and ground potentials are applied to lines B0, B1, respectively. When the logical 0 (1, 0) state is read from cell 2, ground and positive potentials are sensed on lines B0, B1, respectively. Similarly, ground potential is applied to lines B0, B1 to write an X state into cell 2; however, positive potentials are sensed on lines B0, B1 during subsequent reading of the X state. The sense amplifiers 40, 41 of FIG. 2 store the correct logical value in the first position of the data register 10 by applying their outputs to the set and reset inputs S and R. A logical 1 output from sense amplifier 40 stores a logical 1 in register 11 irrespective of the output from amplifier 41**.

The memory cell illustrated in FIG. 4 has several distinct advantages. All active devices are used which enhances the integrated circuit fabrication. Minimal power dissipation occurs due to the complementary symmetry of the insulated gate field effect transistor devices. Only a single two-terminal supply is required. It provides economic fabrication relative to that required for bipolar transistor configurations. The storage can be made non-volatile with low power drain, battery powered operation. The storage capacity can be appreciably larger than that for other known constructions due to the reduced power dissipation, smaller cell area and reduced loading.

A modification of the improved cell of FIG. 4 is illustrated in FIG. 6. The circuit in FIG. 6 is particularly advantageous for use in very large and/or high performance (speed) memory arrays. These additional features are provided by minimizing current leakage through the transistor circuits and by isolation which reduces certain of the drive requirements for the latches. Those components of FIG. 6 which correspond to components in FIG. 4 have been assigned the same reference numerals. Thus, a pair of latch stages 51, 52 comprising transistors **55*a*, 56*a*, 57*a*, 58*a* and 56*b*, 56*b* 57*b* and 58*b* are provided in FIG. 6. Each of the latches has a write enable gate 59*a* and 59*b* and readout gates 60*a* and 60*b* as in FIG. 4**.

In order to reduce the drive requirements for the drivers such as that illustrated in FIG. 2, a pair of P channel insulated gate field effect transistors **70*a* and 70*b* are interposed in the feedback paths to the inputs of the respective latches. Thus, transistor 70*a* has its source and drain connections connected respectively to the source, drain terminals of the transistors 57*a*, 58*a* and to the input gate electrodes of transistors 55*a* and 56*a*. The gate electrode of the transistor 70*a* is connected directly to the gate electrode of the transistor 59*a* and to the write enable line 6-1. Thus, when the transistor 59*a* is turned on to couple input signals from the line B0 to the gate electrodes of the transistors 55*a*, 56*a*, the transistor 70*a* is turned off opening up the feedback coupling from the transistors 57*a* and 58*a*. This minimizes the input drive requirements at the line B0**.

In a similar manner, the transistor **70*b* is turned off when the transistor 59*b* is turned on to couple input signals from the line B1 to the input gates of transistors 55*b* and 56*b* thus minimizing the input drive requirements to line B1. This permits the use of wider tolerance write levels on the bit lines B0, B1. At all times, except during the write mode of operation, the devices 70*a* and 70*b*** are turned on and provide a regenerative feedback path for each latch of the cell.

A second pair of insulated gate field effect transistors **71*a* and 71*b* are interposed between the connection between lines B0, B1 and the output transistors 60*a*, 60*b*. This substantially reduces leakage currents in the circuit. However, this embodiment requires the addition of a read line 72 (which can be the same read line 14). During read cycles, the line 72 is raised to the positive level to turn on the transistors 71*a* and 71*b*. This permits the positive voltage applied to the word line 7-1 to be applied through any turned on transistor 60*a* or 60*b* to a respective data line B0 or B1 as described above with respect to FIG. 4**.

The addition of transistors **71*a* and 71*b* (between the respective data lines B0, B1 and the readout transistor gates 60*a*, 60*b*) blocks the paths described above with respect to FIG. 4 for applying search/select signals on B0, B1 to the word line 7-1. In order to provide a suitable path in FIG. 6, N channel insulated gate field effect transistors 73*a* and 73*b* are provided. The transistors 73*a* and 73*b* are connected between the positive supply terminal +V and respective transistors 60*a*, 60*b*. Their gate electrodes are connected respectively to the data lines B0 and B1. Thus, whenever a positive signal level is applied during a search/select cycle to the data line B0 or B1, it will turn on the corresponding transistors 73*a* or 73*b* to couple the positive supply potential through a respective turned on transistor 60*a* or 60*b* to the word line 7-1**.

Although the improved cells of FIGS. 4 and 6 have been illustrated making use of complementary insulated gate field effect transistors of the enhancement type, it will be appreciated that they may be implemented in other forms. For example, as in the case illustrated with respect to FIGS. 2 and 3, the cells may be built with single channel devices, i.e., all N channel transistors.

FIG. 7 illustrates a suitable sense amplifier and selector latch circuit 8-1. Circuit 8-1 includes a conventional latch 80 having an input connected to line 17. The latch is switched to its "set" state when energized at the beginning of a search cycle by a SELECTOR SET signal on line 17. A "mismatch" signal on word line 7-1 (as described above) is applied to latch 80 (to reset it) via a field effect transistor 82 and a sense amplifier 83. Transistor 82 is turned on by a +SEARCH CONTROL signal on line 16.

When the latch 80 is in its "set" state, it turns field effect transistor 86 on. A subsequent +READ signal on line 14 causes the positive potential +V to be applied to the word line 7-1 via transistors 86 and 84. In the absence of a +READ signal, transistor 85 is turned on to couple the word line 7-1 to ground potential.

FIG. 8 is a timing diagram given merely by way of example to illustrate writing a logical 1 into the first cell of word 3-1, making a search/select wherein only word 3-1 produces a match, and reading out of the logical 1 stored in said first cell.

A logical 1 (+V) data bit is shown being stored in the first position of the data register 11 early in the write cycle. Shortly thereafter, the data bit applies signals to the B0, B1 lines of column 4-1 under control of the mask register. The WRITE ENABLE signal on line 6-1 thereafter sets the first cell in word 3-1 to the logical 1 (0, 1) state.

Early in the search/select cycle, a logical 1 (+V) search argument signal is stored in the first position of the register 11 and the selector latches 80 of circuits 8-1 to **8-*n* are set (if not already set). When the SEARCH CONTROL signal is applied to line 16, the mismatch signals on word lines 7-2 to 7-*n* are applied to the sense amplifiers 83 of circuits 8-2 to 8-*n* to reset the corresponding latches 80**.

During the read cycle, the +READ signal is applied to line 14 to apply a positive potential to word line 7-1 via transistors 84, 86. The first cell of word 3-1 extends the positive potential on line 7-1 to line B0. Sense amplifiers 40, 41 cause the first position of register 11 to be set to the logical 1 state.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A driver circuit for an associative array having four-state cells and only a pair of data lines for one cycle writing of data into, one cycle search/select, and one cycle reading of data from each cell, said circuit comprising a first input line for receiving binary data signals, a second input line for receiving don't care signals, a pair of junctions, field effect transistor means connected to the first and second lines and responsive to the logical value of the data signal concurrent with the presence of a don't care signal for applying the same selected data signal value to both junctions, field effect transistor means connected to the first and second lines and responsive to the logical value of the data signal concurrent with the absence of a don't care signal for applying complementary data signal values selectively to the junctions, and field effect transistor means selectively operated during search/select and write cycles for coupling each junction to a respective data line.

2. The circuit set forth in claim 1 further comprising a third line for receiving read signals, sense amplifiers means, and field effect transistor means connected to the third line and responsive to each read signal for coupling the data lines to the sense amplifier means.

3. The circuit set forth in claim 1 wherein the first-mentioned field effect transistor means comprises first and second complementary field effect transistors of the insulated gate type connected in series and having their gate electrodes connected to each other and to the first input line and having the connection therebetween coupled to one of said junctions for applying data signals to said one junction, third and fourth complementary field effect transistors of the insulated gate type connected in series and having their gate electrodes connected to each other and to the second input line, and a fifth field effect transistor of the insulated gate type having its source and drain terminals connected to respective ones of the junctions and having its gate electrode connected to the connection between the third and fourth transisters for short-circuiting the junctions in the presence of don't care signals on the second input line.

4. The circuit set forth in claim 3 wherein the second-mentioned field effect transistor means comprises said first and second transistors, and a sixth field effect transistor of the insulated gate type having its gate electrode coupled to said second input line and having its source and drain terminals connected to the first input line and to the junction other then said one junction for coupling data signals to the other junction complementary to the data signals at the one junction in the absence of don't care signals on the second input line.

5. The circuit set forth in claim 4 wherein the third-mentioned field effect transistor means comprises a pair of field effect transistors each having source and drain terminals connected between a respective one of the junctions and a respective one of the data lines and having gate electrodes for receiving signals for turning on the latter transistors to couple the junctions to the data lines.

6. A driver circuit for an associative array having four-state cells and only a pair of data lines for one cycle writing of data into and one cycle reading of data from each cell and one cycle search/select, said circuit comprising a first input line for receiving binary data signals, a second input line for receiving don't care signals,
a pair of junctions,
switching means connected to the first and second lines and responsive to the logical value of the data signal concurrent with the presence of a don't care signal for applying the same selected data signal valve to the both junctions,
switching means connected to the first and second lines and responsive to the logical value of the data signal concurrent with the absence of a don't care signal for applying complementary data signal values selectively to the junctions, and
switching means selectively operated during search/select and write cycles for coupling each junction to a respective data line.

7. The circuit set forth in claim 6 further comprising
a third line for receiving read signals,
sense amplifier means,
field effect transistor means connected to the third line and responsive to each read signal for coupling the data lines to the sense amplifier means.

8. The circuit set forth in claim 6 wherein the switching means are comprised solely of insulated gate field effect transistors of the same conductivity type.

9. A driver circuit for an associative array having four-state cells and only a pair of data lines for writing of data into and searching data in each cell, said circuit comprising
a first input line for receiving binary data signals,
a second input line for receiving don't care signals,
a pair of junctions,
switching means comprised of insulated gate field effect transistors connected to the first and second lines and responsive to the logical value of the data signal concurrent with the presence of a don't care signal for applying the same selected data signal value concurrently to both junctions,
switching means comprised of insulated gate field effect transistors connected to the first and second lines and responsive to the logical value of the data signal concurrent with the absence of a don't care signal for concurrently applying complementary data signal values selectively to the junctions, and
switching means selectively operated during search/select and write cycles for concurrently coupling each junction to a respective one of the data lines.

10. The circuit of claim 9 wherein the switching means comprise complementary insulated gate field effect transistors operated in the enhancement mode.

* * * * *